United States Patent
Hirai

(10) Patent No.: US 8,693,053 B2
(45) Date of Patent: Apr. 8, 2014

(54) IMAGE FORMING APPARATUS AND CORRECTION EFFECT VERIFICATION METHOD

(75) Inventor: Shuji Hirai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 13/238,301

(22) Filed: Sep. 21, 2011

(65) Prior Publication Data

US 2012/0092687 A1  Apr. 19, 2012

(30) Foreign Application Priority Data

Oct. 13, 2010 (JP) ................................. 2010-230915

(51) Int. Cl.
*H04N 1/40* (2006.01)

(52) U.S. Cl.
USPC .......................................... 358/1.9; 358/3.26

(58) Field of Classification Search
USPC ......... 358/1.9, 2.1, 496–498, 1.12, 1.18, 406, 358/504, 400, 500, 488, 449, 486, 3.26, 468
See application file for complete search history.

(56) References Cited

U.S. PATENT DOCUMENTS

| | | | |
|---|---|---|---|
| 6,757,512 B2 | 6/2004 | Miyawaki et al. | |
| 6,975,338 B2 | 12/2005 | Hirai et al. | |
| 7,151,901 B2 | 12/2006 | Hirai | |
| 7,193,642 B2 | 3/2007 | Hirai et al. | |
| 7,203,431 B2 | 4/2007 | Shoji et al. | |
| 7,203,452 B2 | 4/2007 | Miyawaki et al. | |
| 7,206,068 B2 * | 4/2007 | Suzuki .......................... 356/244 |
| 7,343,126 B2 | 3/2008 | Miyawaki et al. | |
| 7,693,466 B2 | 4/2010 | Miyawaki et al. | |
| 7,751,741 B2 | 7/2010 | Hirai | |
| 7,929,873 B2 | 4/2011 | Takeuchi et al. | |
| 7,962,054 B2 | 6/2011 | Nakazato et al. | |
| 2005/0286916 A1 | 12/2005 | Nakazato et al. | |
| 2007/0258723 A1 | 11/2007 | Nakazato et al. | |
| 2008/0253793 A1 | 10/2008 | Ishibashi et al. | |
| 2009/0110413 A1 | 4/2009 | Takeuchi et al. | |
| 2009/0208233 A1 | 8/2009 | Hirai | |
| 2009/0324267 A1 | 12/2009 | Yoshida et al. | |

(Continued)

FOREIGN PATENT DOCUMENTS

| | | |
|---|---|---|
| JP | 2005-202028 | 7/2005 |
| JP | 2005-215340 | 8/2005 |
| JP | 2010-42521 | 2/2010 |
| JP | 2010-197482 | 9/2010 |

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

An image forming apparatus includes a duplex conveyance path where a recording medium can be reversed and re-fed; and an output image detector to detect an image or a test pattern formed on a surface of the recording medium. The image forming apparatus is configured to: detect the test pattern formed on the first side of the recording medium by the output image detector; adjust and correct image forming conditions based on the detection result of the detector; convey the recording medium the first side of which the test pattern is formed on, to a duplex conveyance path; re-feed the recording medium and form a test pattern for verifying correction effect on a backside of the recording medium after correcting and updating the image forming conditions; and detect the test pattern formed on the backside of the recording medium again by the output image detector, thereby verifying the correction effect.

8 Claims, 5 Drawing Sheets

(56) References Cited

U.S. PATENT DOCUMENTS

| | | |
|---|---|---|
| 2010/0033743 A1 | 2/2010 | Hirai |
| 2010/0111547 A1 | 5/2010 | Kawamoto et al. |
| 2010/0329756 A1* | 12/2010 | Mizes .......................... 399/364 |
| 2011/0058823 A1 | 3/2011 | Hirai |
| 2011/0063683 A1 | 3/2011 | Kaneko et al. |
| 2011/0109918 A1* | 5/2011 | Conlon et al. ................. 358/1.2 |

* cited by examiner

SURFACE TEST PATTERN READINGS

BACKSIDE SURFACE CORRECTION EFFECT
VERIFYING TEST PATTERN READINGS

IMAGE FORMING APPARATUS AND CORRECTION EFFECT VERIFICATION METHOD

CROSS-REFERENCE TO RELATED APPLICATIONS

The present application claims priority from Japanese patent application number 2010-230915, filed on Oct. 13, 2010, the entire contents of which are incorporated by reference herein.

FIELD OF THE INVENTION

The present invention relates to a multi-function image forming apparatus having one or more capabilities as a copier, a printer, a facsimile machine, a plotter, and the like, and in particular relates to an image forming apparatus including a detector to obtain image information from an image formed on a recording medium by the image forming apparatus, and a correction effect verification method based on the obtained image information.

BACKGROUND OF THE INVENTION

It is known to provide, in an interior of an image forming apparatus, a detector to detect a final image on a recording medium or sheet and many proposals have been made so far. The image formed on the recording medium is detected by the detector and the image quality is determined based on the detection result, or used as feedback to recursively change or correct image forming condition.

To detect the image formed on the recording medium, in the case of using a test pattern that is not an actual image, the number of sheets used must be minimized. Accordingly, a method of using both sides of the recording medium has been proposed.

JP-2005-202028-A discloses a technique to automatically detect both sides of the sheet in one test printing. Specifically, when a color detector to detect a patch on the recording medium is disposed at a duplex-print conveyance path and a discharge conveyance path and the patch is detected by the color detector, a first surface and a second or backside surface are detected in one test printing. This technique has an advantage that the test patches on the first and second surfaces of the recording medium can be detected at once. However, after detection of the test patches on the first or the second surface, when the detection result is fed back to change the image forming condition and the changing or correction effect needs to be confirmed by forming test patches again, another sheet needs to be conveyed again, which does not contribute to the reduction of the recording sheet.

JP-2005-215340-A discloses a configuration in which each of the first surface and the second surface is provided with an individual reading means. The same also discloses a technique in which an image forming condition for the first surface is obtained from the image formed on the first surface and that for the second surface is obtained from the image formed on the second surface, respectively, so that each image forming condition is made different. However, the use of two reading means increases both the size and the cost of the apparatus. Moreover, even in this case, another sheet needs to be supplied to confirm the correction result after test patches have been formed again.

BRIEF SUMMARY OF THE INVENTION

The present invention is conceived in light of the foregoing problems, and provides an inexpensive, compact image forming apparatus capable of detecting an image on a recording medium; forming a correction test pattern to securely obtain the detection result of the image on the recording medium; and forming a correction effect verifying test pattern, without uselessly consuming the recording medium.

As an aspect of the present invention, the image forming apparatus includes a duplex conveyance path in which a recording medium can be reversed and re-fed and an output image detector to detect an image or a test pattern formed on a surface of the recording medium. The image forming apparatus is configured to: detect the test pattern formed on the first side of the recording medium with the output image detector; adjust and correct image forming conditions based on the detection result of the detector; convey the recording medium on the first side of which the test pattern is formed to a duplex conveyance path; re-feed the recording medium and form a test pattern for verifying correction effect on a backside thereof after correcting and updating the image forming conditions; and detect the test pattern formed on the backside of the recording medium again with the output image detector, thereby verifying the correction effect.

These and other objects, features, and advantages of the present invention will become apparent upon consideration of the following description of the preferred embodiments of the present invention when taken in conjunction with the accompanying drawings.

DETAILED DESCRIPTION OF THE INVENTION

Preferred embodiments of the present invention will now be described with reference to the accompanying drawings.

Figure 1:
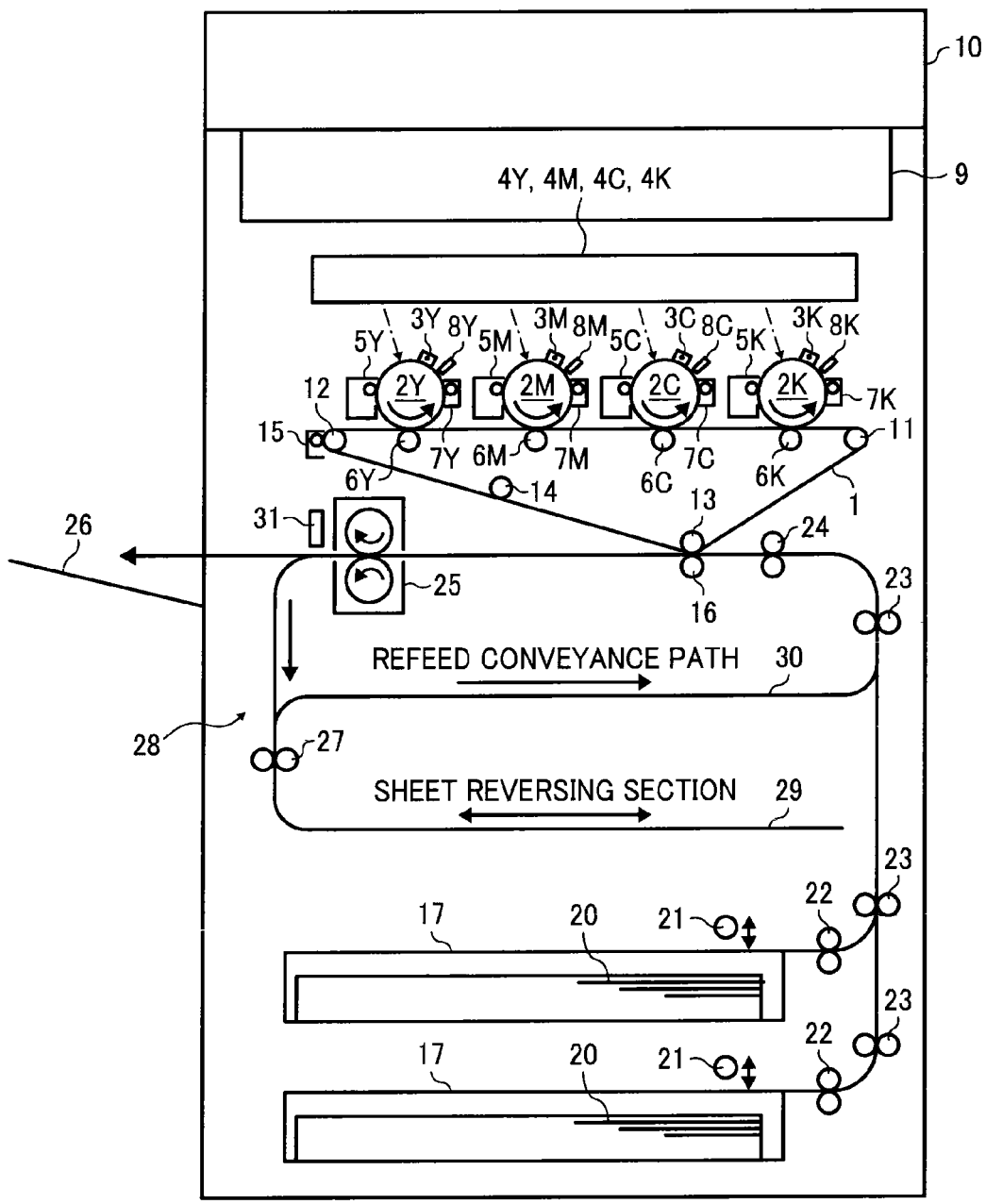
FIG. 1 shows a general configuration of an image forming apparatus according to embodiments of the present invention.

A general configuration of an image forming apparatus according to one embodiment of the present invention will now be described with reference to FIG. 1. As illustrated in FIG. 1, an image forming section of the image forming apparatus has a full-color electrophotographic system, employing a tandem-type intermediate transfer method. It should be noted, however, that the present invention is not limited to such a system but is also applicable to various apparatuses using one-drum intermediate transfer belt method, a tandem-type direct transfer method, a one-drum direct transfer method (for monochrome printing), and the like.

As illustrated in FIG. 1, photoreceptor drums 2Y, 2M, 2C, and 2K as image carriers are disposed in parallel along a developing surface of the intermediate transfer belt 1 as an intermediate transfer body. The suffix "Y" indicates the color yellow and M, C, and K, respectively, denote magenta, cyan, and black. Hereinafter, a yellow image forming station will be described as representative. Around the photoreceptor drum 2Y, a charger 3 as a charging means, a writing unit 4Y, a developing unit 5Y, a primary transfer roller 6Y, a photoreceptor cleaning unit 7Y, and a quenching lamp 8Y are disposed along a direction of rotation of the photoreceptor drum 2Y. The other image forming stations are configured similarly. At an upper side of the writing unit 4, a scanner 9 and an Automatic Document Feeder (ADF) 10 are disposed.

The intermediate transfer belt 1 is rotatably supported by a plurality of rollers 11, 12, and 13. An intermediate transfer belt cleaning unit 15 is disposed opposite the roller 12. A secondary transfer roller 16 as a secondary transfer means is disposed opposite the roller 13. In the bottom of the apparatus, there are provided a plurality of sheet feed trays 17 as a sheet feed section. Recording sheets 20 as recording media contained in these trays are fed one by one by a pickup roller 21 and a sheet feed roller 22, are conveyed by a pair of conveyance rollers 23, and are sent to the secondary transfer section at a predetermined timing by a pair of registration rollers 24. A fixing unit 25 as a fixing means is disposed downstream of the secondary transfer section in the sheet conveyance direction. Reference numeral 26 in FIG. 1 denotes a sheet discharge tray, 28 denotes a duplex conveyance path, and 27 denotes a pair of switchback rollers. The duplex conveyance path 28 includes a sheet reversing section 29 and a re-feed conveyance path 30. An output image detector 31 as an output image detecting means is disposed in the vicinity and downstream of the fixing unit 25.

An image forming operation conducted using the configuration as illustrated in FIG. 1 will be described briefly.

When a print start command is input, each roller disposed around the photoreceptor drum, around the intermediate transfer belt, along the sheet feed and conveyance path, and the like, starts rotating at a predetermined timing and feeding of a recording sheet from the sheet feed tray starts.

At the same time, a surface of each photoreceptor drum 2 is charged to a uniform electric potential by the charger 3, and the writing unit 4 radiates light on the surface to expose it according to image data. The electric pattern formed after exposure is called electrostatic latent image. The photoreceptor drum 2 on which the electrostatic latent image is carried is supplied with toner from the developing unit 5, whereby the electrostatic latent image carried thereon is developed into color toner images of specific colors.

As illustrated in FIG. 1, there are four photoreceptors 2 respectively used for a toner image of yellow, magenta, cyan, and black, and therefore, a toner image of each color is formed on the corresponding photoreceptor drum 2. (The order of the colors is different from system to system.)

The color toner image developed on each of the photoreceptor drums 2 is transferred onto the intermediate transfer belt 1 at a contact point between each drum 2 and the intermediate transfer belt 1 by a primary transfer bias applied to the primary transfer roller 6 disposed opposite the photoreceptor drum 2 and by pressure. This primary transfer operation is repeated for four colors with a matched timing, thereby forming a full-color toner image on the intermediate transfer belt 1.

The full-color toner image formed on the intermediate transfer belt 1 is transferred at the secondary transfer roller 16 onto the recording sheet 20 which is conveyed at a matched timing by the pair of registration rollers 24. In this case, secondary transfer is performed with the secondary transfer bias applied to the secondary transfer roller 16 and pressure. The recording sheet 20 on which a full-color toner image has been transferred is heated while passing through the fixing unit 25, and the toner image carried thereon thus heated is fused and fixed onto the recording sheet 20.

In a case of single-sided copying or printing, the recording sheet 20 is directly conveyed to the sheet discharge tray 26. In a case of duplex copying or printing, the recording sheet 20 is reversed upside down and is conveyed to the sheet reversing section 29. Upon the sheet recording sheet 20 arriving at the sheet reversing section 29, the conveyance direction of the recording sheet 20 is reversed by the pair of switchback rollers 27, and therefore, the trailing edge of the sheet first passes through the sheet reversing section 29. This operation by which the sheet surface is reversed is called a switchback.

The thus-reversed recording sheet 20 does not return to the fixing unit, passes through the re-feed conveyance path 30, and joins the normal sheet conveyance path. Thereafter, the toner image is transferred to the recording sheet 20 similarly to the case of the first-side print, and the recording sheet 20 passes through the fixing unit 25 and is discharged outside. The duplex print operation is thus terminated.

The photoreceptor drum 2 that has passed through the primary transfer section carries residual toner after the primary transfer on the surface thereof. This residual toner is removed by the photoreceptor cleaning unit 7. The cleaning unit 7 includes a blade, a brush, and the like. Then, the surface of the photoreceptor drum 2 is electrically uniformly discharged by the quenching lamp 8 and is prepared for the electric charge for a next image formation.

The intermediate transfer belt 1 that has passed through the secondary transfer section carries residual toner thereon. This residual toner remaining on the intermediate transfer belt 1 is also removed by the intermediate transfer belt cleaning unit 15 including a blade, a brush, and the like. Then, the intermediate transfer belt 1 is prepared for a next toner image transfer. With such repeated operation, the one-side print or the duplex print is performed.

As described above, the output image detector 31 disposed downstream of the fixing unit 25 detects an image on the recording sheet 20. After the image or the test pattern formed on the surface of the recording sheet 20 has been detected, the recording sheet 20 is conveyed to the sheet reversing section 29 with its direction reversed upside down by a conveyance path switching means, not shown, passes through the re-feed conveyance path 30, and comes to be in a re-feedable state.

Meanwhile, image forming conditions (various parameters) are adjusted and corrected based on the detected information on the image on the surface of the recording sheet 20. Upon above various adjustment/correction having been completed and image forming conditions having been updated, the recording sheet 20 being in a standby mode at the re-feed conveyance path 30 starts to be fed again and a test pattern for verifying effect is formed on the reverse surface of the recording sheet.

This effect-verifying test pattern is again fixed and read by the output image detector 31, and the recording sheet 20 is discharged to the sheet discharge tray 26.

Figure 2:
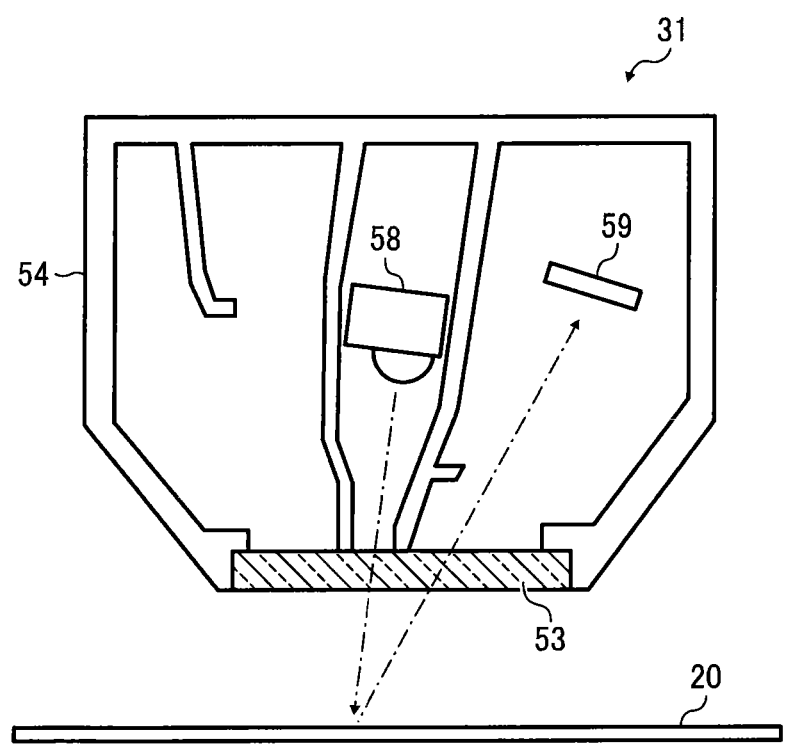
FIG. 2 is a general configuration of an output image detector.

FIG. 2 shows an example of the output image detector 31 of the present embodiment. The output image detector 31, being a single-eyed spot detector includes a light-emitting element 58 and a light-receiving element 59 with an RGB filter. As illustrated in FIG. 2, the output image detector 31 further includes a dustproof glass or lens 53 and a detector case 54.

Figure 3:
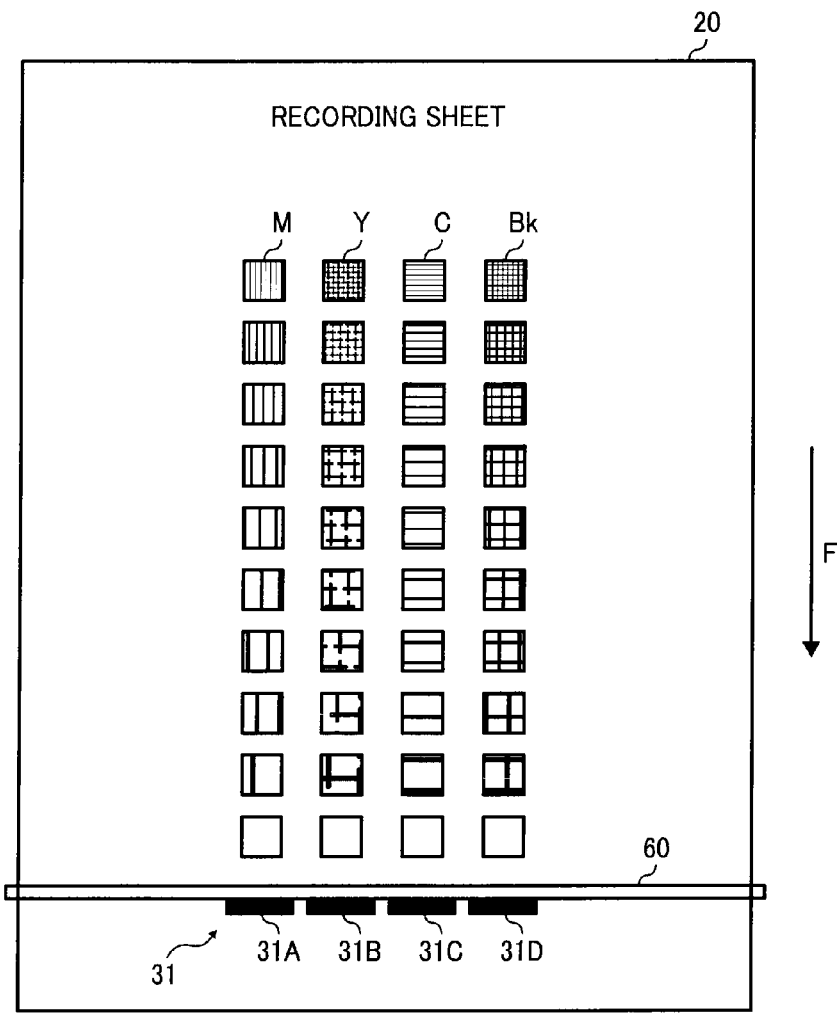
FIG. 3 is a plan view illustrating a spatial relation between a test pattern formed on a recording sheet and the output image detector.

When using this type of detector for a full-color apparatus, because one detector detects only one point in the main scanning direction, a plurality of detectors for each color needs to be installed. Even a single detector itself with an RGB filter can detect many colors as illustrated in FIG. 2, but considering the limited size of the recording sheet 20 in the sheet conveyance direction, it is very difficult to arrange patterns of all colors on the recording sheet 20 in the sheet conveyance direction. It is possible to arrange one patch for each color, but the plurality of gradation patterns can hardly be arranged. Accordingly, it is preferred that a detector head for each color be disposed along the main scanning direction so that the test pattern information of each color can be collected simultaneously FIG. 3 shows an optimal arrangement of the detectors. A detector board 60 is disposed opposite and above the surface of the recording sheet 20. Each of the output image detectors 31A, 31B, 31C, and 31D is disposed on the detector board 60 so as to be opposite a corresponding row of the test patterns M, Y, C, and Bk, respectively. M represents a row of test patterns of magenta, Y a row of test patterns of yellow, C a row of test patterns of cyan, and Bk a row of test patterns of black, respectively. Each test pattern row includes gradation levels and its gradation gradually decreases downstream in the conveyance direction (arrow F direction in FIG. 3) of the recording sheet.

Figure 4:
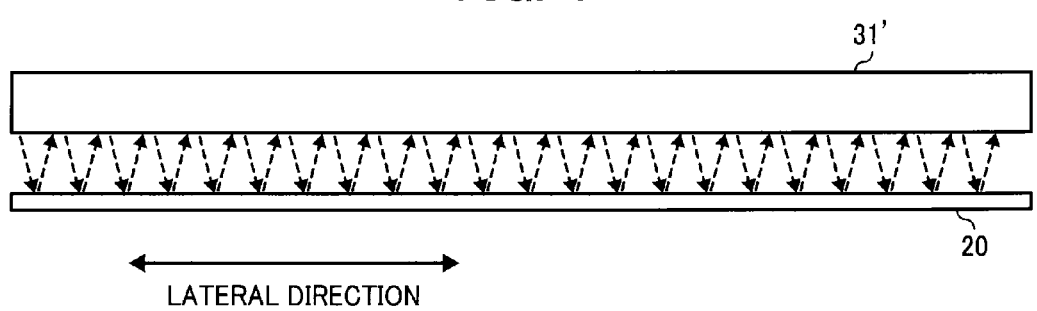
FIG. 4 is a side view illustrating a state of detection by another output image detector.

FIG. 4 shows an output image detector 31'.

An output image detector 31' in another embodiment is formed of a line detection-type detector such as Charge Coupled Device (CCD) or Contact Image Detector (CIS). These linear detection detectors are basically formed of small spot detectors connected serially as illustrated in FIG. 2.

When the linear detection detector is used, patterns of each color need not be arranged in the sheet conveyance direction and the gradation patterns may be disposed also in the main scanning direction, thereby making the pattern layout freer. However, the linear detection detector is more expensive than the spot detector.

In the present invention, a test pattern for correction control is formed on the first surface of the recording sheet and a test pattern for verifying the effect of the correction is formed on the second surface thereof. In this case, the test pattern formed on the first surface may adversely affect the detection output of the second side of the recording sheet.

In such a case, the first-side pattern must not be overlaid positionally on the second-side pattern, thereby halving the useable surface of the recording medium. Accordingly, because there may be a case in which the spot detector cannot handle the necessary pattern number and patch size, the linear type detection detector may be installed alternatively.

Figure 5A:
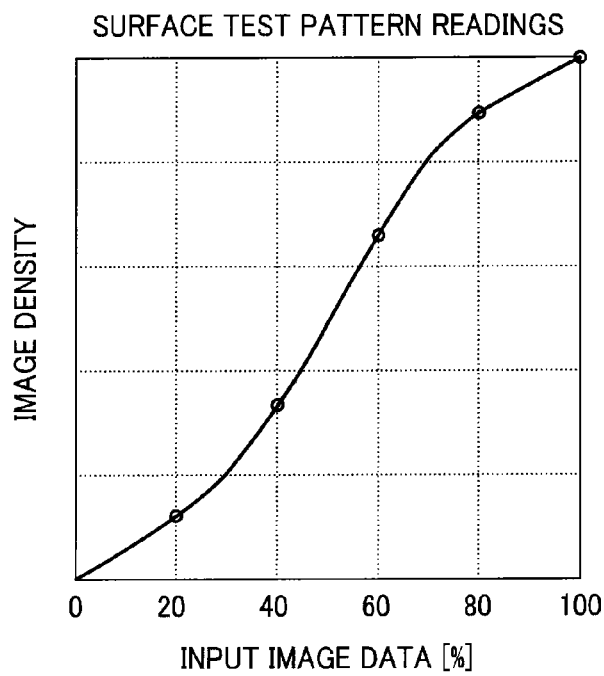
FIG. 5A is a graph illustrating surface test pattern readings and FIG. 5B is a graph illustrating backside surface correction effect verification test pattern readings.
Figure 5B:
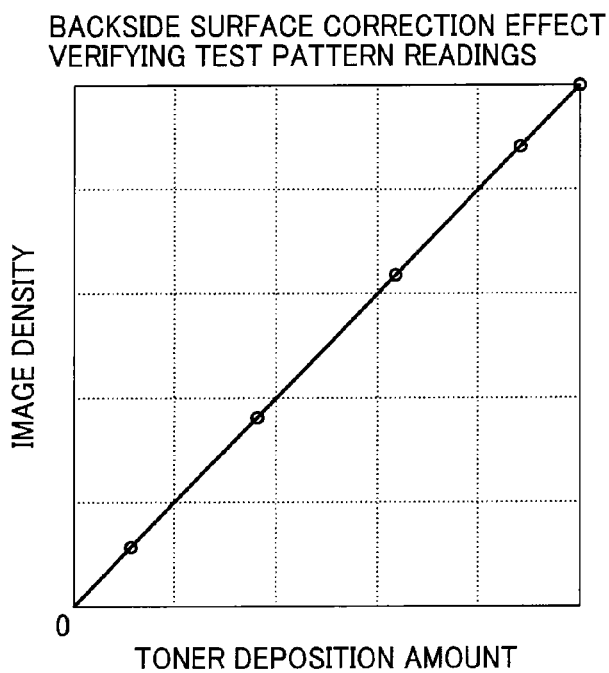

The correction test pattern to be formed on the first side and the test pattern for verifying the correction result formed on the second side are basically the same. For example, when the gradation pattern as illustrated in FIG. 3 is output on the first surface, the gradation levels as illustrated in FIG. 5A can be obtained. As long as the gradation levels are corrected as illustrated in FIG. 5B, it is determined that the control effect is satisfactory and the same gradation pattern is satisfactory.

In addition, if a pattern with a large number of gradation levels needs to be formed on the first side as a correction pattern and the number of gradation levels to be formed on the second side needs to be reduced so that the second side pattern does not overlay the first side pattern, the second side pattern may be simplified.

Figure 6:
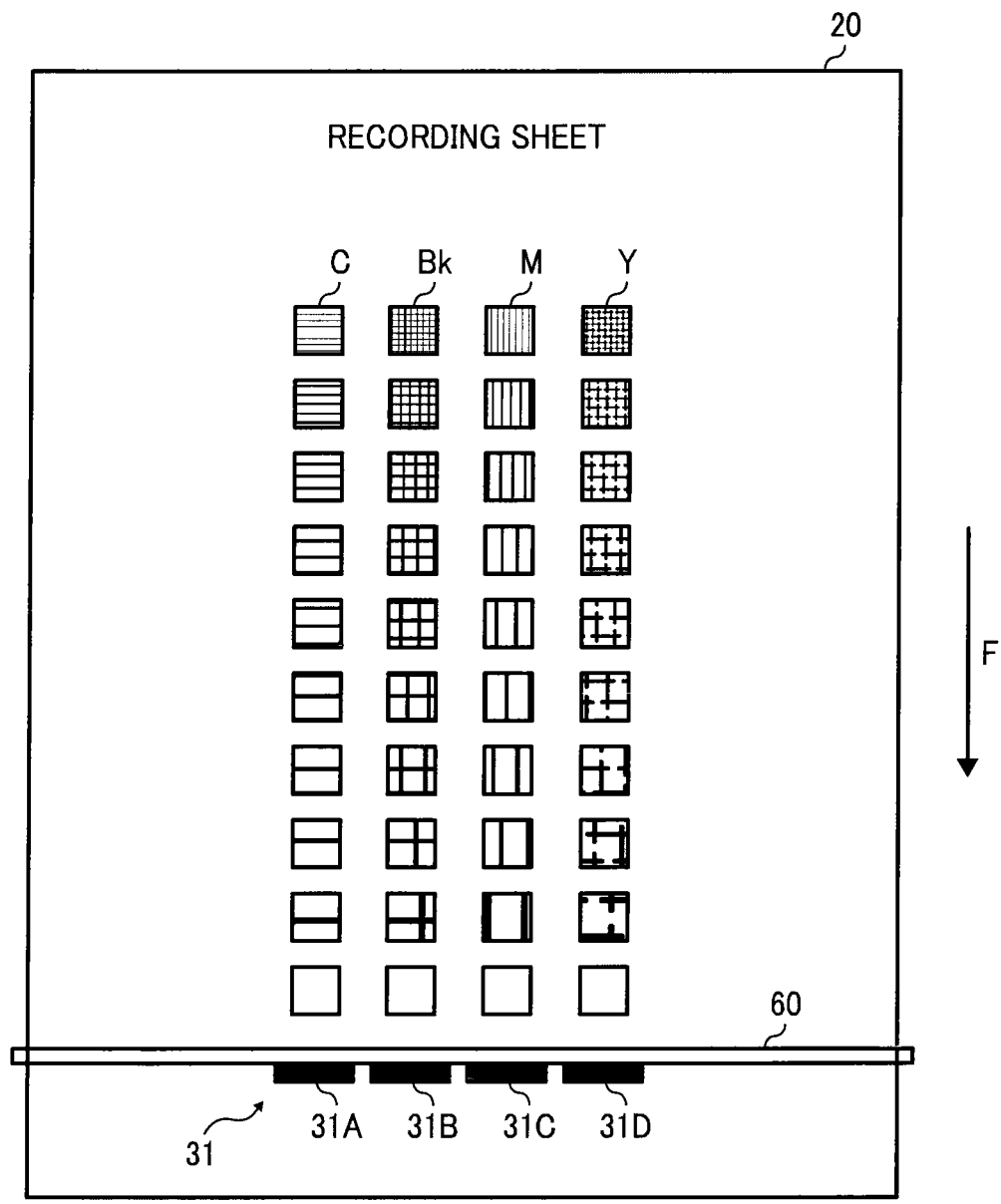
FIG. 6 is a plan view illustrating a spatial relation between the test pattern formed on a recording sheet and the output image detector as in FIG. 3, in which a sequence of the test pattern in the main scanning direction is changed.

As a result of detecting the verifying pattern formed on the second side, there may be a case in which correction effect is not properly obtained. In such a case, after the gradation levels as illustrated in FIG. 5A are obtained as to the first side, the gradation levels as illustrated in FIG. 5A are again obtained as to the second side. In such a case, the correction control needs to be performed again using another recording sheet. When performing the correction control step and the verifying step again, positions of the test patterns in the main scanning direction are changed from the previous time. FIG. 6 shows an example of patterns. In addition, compared to the previous pattern as illustrated in FIG. 3, a sequence of the colors in the main scanning direction is changed. For example, in a case in which a cyan photoreceptor includes a certain defect (such as smears or filming) and as a result the pattern of the second spot detector position from the right in FIG. 3 has a problem, the consecutive control effect may be improved by shifting the cyan pattern to the left end spot detector position.

If an abnormal image noticeable to a user is formed, replacement of a part is necessary. However, even when a slight defect is observed and an optimal correction control effect cannot be obtained as a result, there is a possibility that a good effect can be obtained by shifting the pattern as described above.

The determination of the above correction effect can be performed automatically by a controller, not shown. The controller, may be implemented as a central processing unit (CPU) provided with a random-access memory (RAM) and a read-only memory (ROM), for example, and executing programs stored in memory. If the controller determines, based on the measurement data or readings as illustrated in FIG. 5, that the image defect exceeds a predetermined level noticeable to the user, the controller outputs a message to a display panel, not shown, notifying the user that parts replacement is required.

Additional modifications and variations of the present invention are possible in light of the above teachings. It is therefore to be understood that, within the scope of the appended claims, the invention may be practiced other than as specifically described herein.

What is claimed is:

1. An image forming apparatus comprising:
    a duplex conveyance pathway along which a recording medium can be reversed and re-fed;
    an output image detector to detect an image or a test pattern formed on a surface of the recording medium;
    an adjustment and correction unit to adjust and correct image forming conditions based on the detection result of the detector;
    a conveyance unit to convey the recording medium on a surface of which the test pattern is formed to the duplex conveyance pathway in which the recording medium is in a state of being fed again; and
    a re-feed unit to re-feed the recording medium and form a test pattern for verifying correction effect on a backside of the recording medium after correcting the image forming conditions,
    wherein the detector detects the test pattern formed on the backside of the recording medium again to verify the correction effect after the adjustment and correction unit corrects the image forming conditions based on the detection results obtained by the detector.

2. The image forming apparatus as claimed in claim 1, further comprising a sheet feed section,
    wherein, when the image forming apparatus determines that the correction effect is not properly performed as a result of detecting the correction effect verifying pattern formed on the backside of the recording medium, another recording medium is fed from the sheet feed section to adjust and correct image forming conditions and again verify the correction effect.

3. The image forming apparatus as claimed in claim 2, wherein the image forming apparatus changes a sequence of the test patterns in the main scanning direction.

4. The image forming apparatus as claimed in claim 2, wherein the image forming apparatus changes a color sequence of the test patterns in the main scanning direction on the another recording medium compared to a color sequence of the test patterns in the main scanning direction on the recording medium.

5. A correction effect verification method for an image forming apparatus, comprising:
  forming an image or a test pattern on a surface of a recording medium;
  detecting with an output image detector the image or test pattern formed on the surface of the recording medium,
  adjusting and correcting image forming conditions based on a detection result obtained by the detector;
  conveying the recording medium on a surface of which the test pattern is formed to a duplex conveyance pathway within the image forming apparatus so that the recording medium is in a state of being fed again;
  re-feeding the recording medium and forming a test pattern for verifying correction effect on a backside of the recording medium after correcting and updating the image forming conditions; and
  detecting the test pattern formed on the backside of the recording medium again with the output image detector to verify the correction effect.

6. The correction effect verification method as claimed in claim 5, further comprising:
  adjusting and correcting image forming conditions; and
  re-feeding another recording medium from a sheet feed section when the image forming apparatus determines that the correction effect is not properly performed as a result of detecting the correction effect verifying pattern formed on the backside of the recording medium.

7. The correction effect verification method in an image formation as claimed in claim 6, further comprising:
  changing a sequence of the test patterns in a main scanning direction.

8. The correction effect verification method in an image formation as claimed in claim 6, further comprising:
  changing a color sequence of the test patterns in the main scanning direction on the another recording medium compared to a color sequence of the test patterns in the main scanning direction on the recording medium.

* * * * *